(12) United States Patent
Prozeniuk et al.

(10) Patent No.: US 7,940,896 B2
(45) Date of Patent: May 10, 2011

(54) ADAPTION OF EMERGENCY CALLS TO THE EMERGENCY SERVICES NETWORK BASED ON CALLER LOCATION

(75) Inventors: Perry Prozeniuk, Carleton Place (CA); Severin Beauvais, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 1350 days.

(21) Appl. No.: 11/427,362

(22) Filed: Jun. 29, 2006

(65) Prior Publication Data

US 2008/0037715 A1   Feb. 14, 2008

(51) Int. Cl.
  *H04M 11/00*   (2006.01)
(52) U.S. Cl. ........................ 379/45; 379/37
(58) Field of Classification Search ............. 379/45, 379/37
  See application file for complete search history.

(56) References Cited

U.S. PATENT DOCUMENTS

| | | | |
|---|---|---|---|
| 7,440,442 B2 * | 10/2008 | Grabelsky et al. | 379/45 |
| 2005/0186948 A1 * | 8/2005 | Gallagher et al. | 455/414.1 |
| 2007/0003024 A1 * | 1/2007 | Olivier et al. | 379/45 |

* cited by examiner

*Primary Examiner* — Stella L Woo
(74) *Attorney, Agent, or Firm* — Anderson Gorecki & Manaras LLP

(57) ABSTRACT

The invention includes a technique for integrating emergency calling for VoIP users with legacy emergency services to facilitate adapting to the evolving emergency services network and the services that are available in a given location. Generic location information provided by (or determined for) VoIP emergency callers, typically in civic or geodetic formats, is translated into Emergency Response Locations (ERLs) defining an area, such as an area within an enterprise premises, in which the caller is located. The translated location information is conveyed to the Public Safety Answering Point (PSAP) with the emergency call in for form of the ANI (Automatic Number Identification) or calling line identification number. An appropriate route/gateway is then selected to be used to reach the PSAP appropriate for the caller's location, and an emergency call notification to the appropriate local emergency response personnel is generated within the enterprise based on the caller's location.

17 Claims, 4 Drawing Sheets

ADAPTION OF EMERGENCY CALLS TO THE EMERGENCY SERVICES NETWORK BASED ON CALLER LOCATION

FIELD OF THE INVENTION

This invention relates generally to the field of telecommunications, and more particularly to emergency calling services.

BACKGROUND OF THE INVENTION

Emergency calling services are widely utilized and relied upon. In the United States, the "911" emergency calling system handles approximately 500,000 calls daily. Emergency calls in the existing emergency services network in North America are routed to an emergency response center known as a Public Safety Answering Point ("PSAP"). In particular, the call is routed to the PSAP that serves the caller's current location. The calling party number is obtained from Automatic Number Identification ("ANI") equipment. ANI is a system utilized by telephone companies to identify the Directory Number ("DN") of a calling subscriber. A pre-configured database known as an Automatic Location Identification ("ALI") database is used to identify the caller's location. The ALI database typically contains location information for subscribers in the public telephone network, maintained by the service provider, and is supplemented with a second database, the PS ALI database, which contains location information for telephone numbers assigned to private (enterprise) networks with location information provided and maintained by the private enterprises. The results from the ANI and ALI searches is provided to the PSAP so that the call taker is provided with a callback number and location. The callback number enables the call taker to attempt to re-establish contact with the emergency caller in the event of disconnect. The location information may be used to direct responders, particularly in the situation where the caller is unable to provide their location to the call taker.

Within an enterprise network, the selection of the ANI to be sent to the PSAP to identify the caller's location is typically based on Emergency Response Locations ("ERLs"). ERLs are zones within the enterprise such as floor, post, section and other designator with which pre-assigned numbers are associated. Each pre-assigned number ("ELIN") has, when defined, an entry made in the ALI database to describe the ERL it represents within the enterprise. With Voice over Internet Protocol ("VoIP") systems, the location of the caller must be dynamically associated with an ERL based on the current location of the IP phone that the caller is using. In an emergency services network such as that described by the National Emergency Number Association ("NENA") in their I3 specification and currently being defined within the IETF and other standards bodies, the legacy procedure of using ANI to convey location to the PSAP and the use of specific PSTN access points to reach the correct PSAP will become obsolete. Location information, probably in the form of IETF GEOPRIV PIDF-LO location records containing Civil and/or coordinate location of the caller will be passed to the PSAP with the emergency call. However, in the interim, where VoIP callers exist prior to the widespread implementation of the evolved "I3 PSAP," or equivalent services by carriers to accept VoIP emergency calls with location information explicitly attached, there is a need to continue to use existing mechanisms to access the emergency services network for VoIP callers. This is problematic because an emergency call that is formatted to reach an "I3" PSAP is not directly compatible with the existing emergency network. Similarly, as I3 PSAPs start to be deployed there will be situations where an I3 PSAP is available in some areas and not in others, particularly when service across multiple countries is considered. The invention also enables the adaptation of signaling from a PBX, that is designed to interface to the existing emergency services network, to interface to an I3 PSAP in areas where they are deployed.

SUMMARY OF THE INVENTION

In accordance with one embodiment of the invention, a method for processing an emergency services request in a communications network, comprises the steps of: receiving the emergency services request; obtaining requester location information in a civil and/or coordinate format; translating the requester location information into an Emergency Response Location (ERL); and conveying the translated requester location information to a Public Safety Answering Point (PSAP).

In accordance with another embodiment of the invention, apparatus for processing an emergency services request in a communications network, comprises: a first network device operative to receive the emergency services request; a processor of the first network device operative to execute an emergency services routing agent to obtain requester location information in civil and/or coordinate format; a memory operative to translate the requester location information into an Emergency Response Location (ERL); and a transmitter operable to convey the translated requester location information to a Public Safety Answering Point (PSAP).

At least one advantage of the invention is enhanced integration of emergency calling system technologies. For example, the invention facilitates handling of VoIP emergency calls where "I3 PSAP" or equivalent services are unavailable. This may be accomplished by performing translation of requester location information into a format that can be processed by available legacy network resources. Further, although the invention is described in the context of a North American telephone network, the inventive concept could also be implemented within the context of other national and international emergency networks.

DETAILED DESCRIPTION

Figure 1:
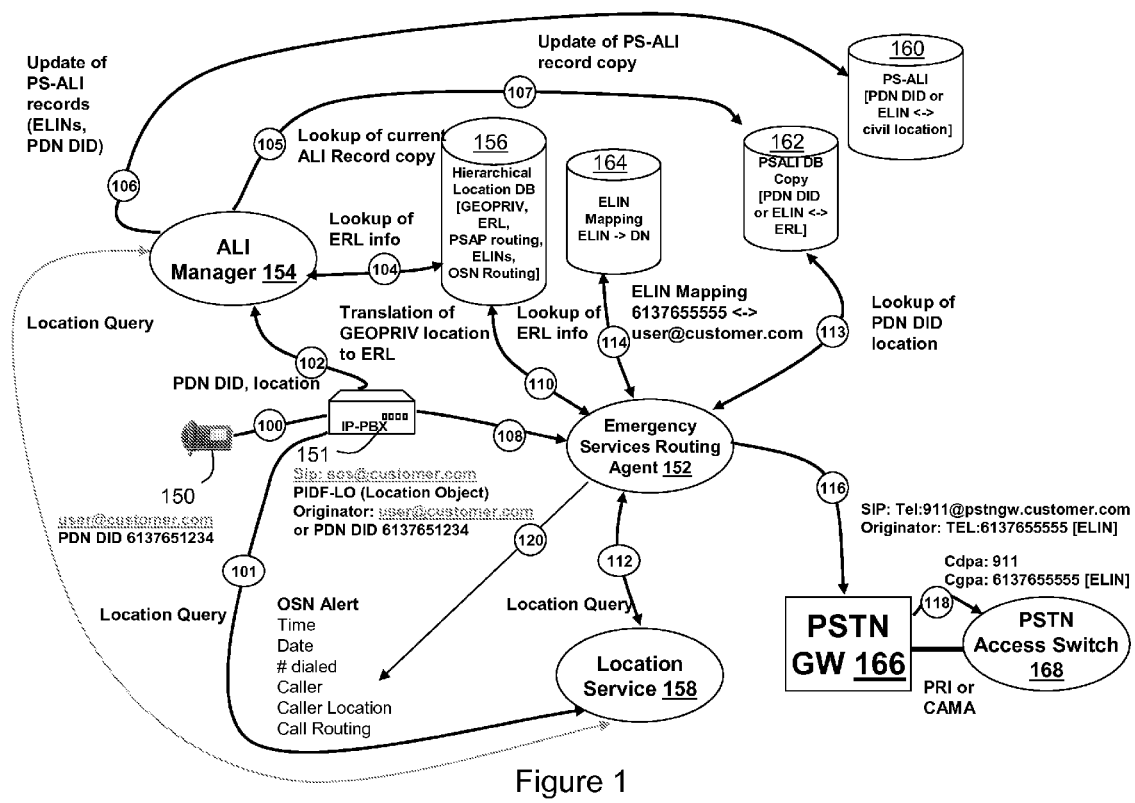
FIG. 1 is a block diagram illustrating outbound emergency call handling with a SIP phone and legacy emergency services.

FIG. 1 illustrates a scenario where a VoIP Phone (150) with service provided by an IP PBX (151) is employed to contact emergency services, e.g., 911, with civil or coordinate location information known, routing to a legacy PSTN Emergency Services Network. Configuration steps will have been executed prior to the call being placed. In step (100) the IP Phone registers with the IP PBX. The IP PBX is in communication with an Emergency Services Routing Agent ("ESRA") (152), which may be executed in a call server, PBX, router, server, gateway, switch, or other network device. In step (101) The IP PBX (151) determines location information for the IP Phone via a mechanism such as a network location service. Alternatively, the IP phone (150) may provide Civil and/or Coordinate location information to the IP PBX (151) as part of a registration process. In step (102) the IP PBX reports a device location change, i.e., new device, to the ALI Manager (154). In step (104) the ALI Manager obtains ERL information for IP Phone and related information from a hierarchical location database (156). If location information is not provided by the IP PBX for the device, the ALI manager (154) may use the provided device identification, e.g., IP and MAC address, to query a network location service (158) to attempt to determine the location of the phone. In step (104) the ALI Manager looks up the location associated with the telephone number (PDN) of the IP Phone in the PS-ALI database copy (162). If the ALI Manager determines that the current ALI record for the PDN does not reflect the IP Phone's current location then an update of the appropriate PS-ALI database (160) with the new location is prompted, based on information obtained in step (104). When the PS-ALI database update is complete, the updated information (including ERL is stored in the PS-ALI DB Copy (162). Note that the record may be tagged with an "update in progress" indicator in step (106) to stop the use of the record temporarily.

Figure 2:
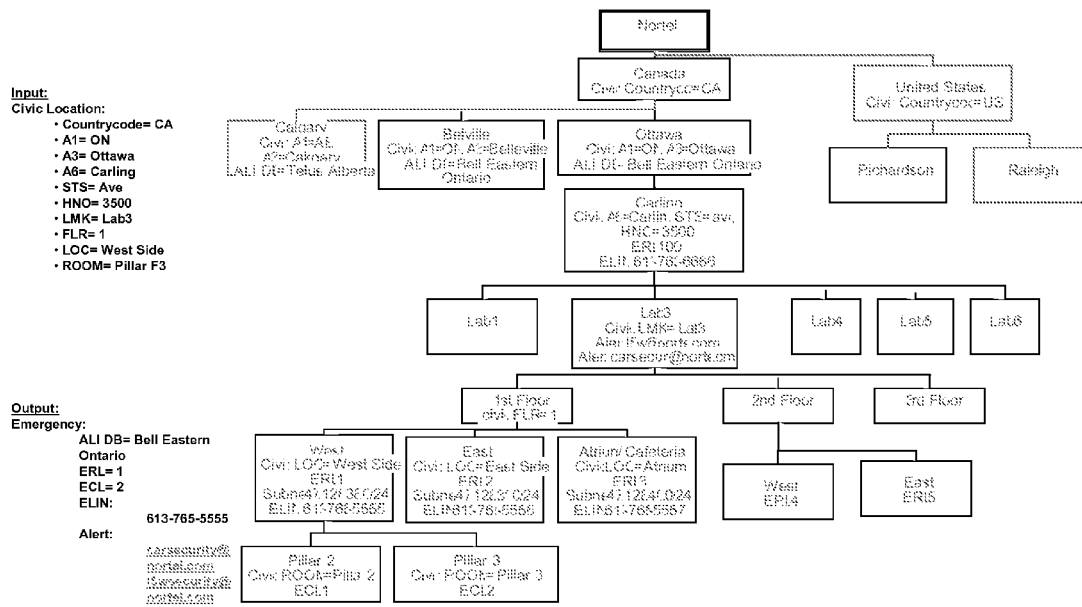
FIG. 2 illustrates an exemplary hierarchical location database.

As shown in FIG. 2, the hierarchical location database (156) may describe the relationship between geographic entities within the enterprise. The illustrated enterprise database defines: (a) the locations of all enterprise sites and locations within those sites; (b) normal real estate entities such as Country, City, Campus, buildings, floors, etc.; (c) emergency response location information within this framework; and (d) ERLs. One or more ERLs can be associated with a building, floor, etc. For each ERL, the database defines emergency call handling data such as routing, ELINs, OSN destination, etc (may be inherited from a higher level in the tree and relevant emergency services and corresponding telephone numbers for the location). The database may also be used to define L2 access equipment and subnets as they relate to location, and could be used to build wiremaps, populate SNMP MIBs for LLDP-MED in L2 switch equipment and to build IP Subnet mapping tables.

Referring again to FIG. 1, at some time later (prior to the completion of the PS-ALI update in step (106), an emergency call is placed from the IP phone, e.g., a call to "SOS." The call will be placed via the IP PBX, which may translate 911 to "SOS." The IP PBX is optional and the call could be placed directly from a capable IP phone. The emergency call is routed using SIP, including location information such as a PIDF-LO object, to the Emergency Services Routing Agent (ESRA) (152) as shown in step (108). The PDN of the IP phone could be included in the call request, and the call might be placed without a DID#, although in the case of a pure IP phone making an emergency call it is more likely that only the SIP return address is provided. In response to the call, the ESRA performs a lookup in the Location DB (156) to determine where in the enterprise LAN that the caller is located, using the attached location to determine the ERL of the caller, as shown in step (110). The lookup also provides an indication that the call will be routed to the traditional emergency services network for the provided location and the appropriate emergency number to be sent is "911." If location information is not provided with the emergency call, the ESRA may query the location service (158) using device identification provided (e.g. IP and/or MAC address of device) to attempt to determine the location of the caller as shown in step (112). In the event that the PDN was provided with the call, most likely only if an IP PBX is involved, the ESRA also performs a lookup in the PS-ALI DB Copy (162) as shown in step (113) to determine the current location of the IP phone as recorded in the PS-ALI database. In this example the location associated with the PDN doesn't match the current location of the phone, since the PS-ALI update has not yet completed to reflect the current location of the IP Phone or because their was no PDN provided or there was no corresponding entry in the database. An ELIN is assigned from those associated with the ERL of the caller, and a mapping is established back to the call originator as shown in step (114). The mapping is updated in the ELIN Mapping DB (164) relating the caller's SIP address with the ELIN assigned. The ESRA selects the appropriate gateway (166) based on the information obtained in steps (110, 112), and forwards the call to the gateway indicating that the calling number is the assigned ELIN, and the called number, e.g., "911" in the U.S., "112" in Europe, etc., as shown in step (116). The gateway selects the appropriate outbound route for the call and transmits the call to the PSTN (168) as shown in step (118), providing the telephone number provided (either PDN or ELIN) as ANI and the called number as 911. The PSTN routes the call to the correct PSAP, which performs a query of the PS-ALI database based on the ANI provided, and receives the current location of the caller. The ESRA provides an emergency call alert to the appropriate local responders as shown in step (120). The alerts destinations and related information were obtained in steps (110, 112) based on the location of the caller.

Figure 3:
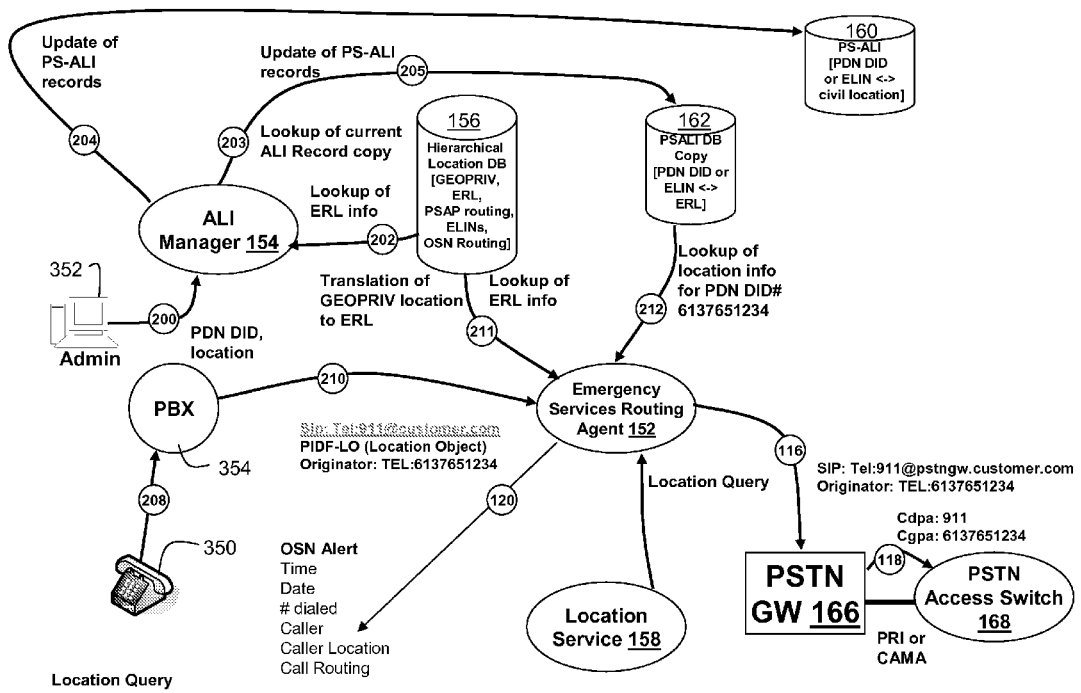
FIG. 3 is a block diagram illustrating outbound emergency call handling with a non-IP phone, routing to Service Bureau emergency Services Network.

FIG. 3 illustrates a scenario where a non-VoIP Phone (350) is employed to contact emergency services, e.g., "911." Prior to the call being placed, pre-configuration procedures may take place. If the non-IP phone is moved, e.g., via a move/add/change procedure, to a new location, then an administrator (352) inputs the new location associated with the PDN of the phone into the ALI Manager (154) as shown in step (200). The ALI Manager performs a lookup of information associated with the entered location (ERL if needed, PS-ALI DB, etc) in the hierarchical database (156) as shown in step (202). In step (203) the ALI Manager looks up the location associated with the telephone number (PDN) of the IP Phone in the PS-ALI database copy (162). If the ALI Manager determines that the current ALI record for the PDN does not reflect the IP Phone's current location then an update of the appropriate PS-ALI database (160) with the new location is prompted. The ALI Manager then updates the PS-ALI database (160) as shown in step (204) based on information obtained in steps (203, 202) with the new location. When the PS-ALI database update is complete, the updated information (including ERL is stored in the PSALI DB Copy (162) as shown in step (206).

At some later time, following the completion of the PS-ALI update, an emergency "911" call is placed from the non-IP phone (150) as shown in step (208). The PBX (354) recognizes the emergency call and routes the call using SIP without location information attached to the Emergency Services Routing Agent ("ESRA") (152) as shown in step (210). An externally dialable (e.g. DID) number is provided as the calling line ID for the call. This may be either the DID associated with the phone or a pre-assigned ELIN. The ESRA uses the provided telephone number to query the PSALI DB copy (162) as shown in step (212) to determine the location associated with the caller. The call then proceeds as with the previous example, with routing to the appropriate emergency services network based on the caller location. The ESRA selects the appropriate gateway based on the information obtained in steps (211, 212), and forwards the call to the gateway with the calling number provided in the request, and the called number is 911 as shown in step (116). The gateway selects the appropriate outbound route for the call and transmits the call to the PSTN as shown in step (118), providing the telephone number provided as ANI and the called number as 911. The PSTN routes the call to the correct PSAP, which performs a query of the PS-ALI database based on the ANI provided, and receives the current location of the caller. The ESRA provides an emergency call alert to the appropriate local responders as shown in step (120). The alerts destinations and related information were obtained in steps (211, 212) based on the location of the caller.

One mechanism that might be used to determine that the call was from a non-IP end devices is by associating the IP addresses of the DSP resources used for these devices with the non-IP phone source. A lookup of the media IP address provided would then provide the required information.

Referring again to FIG. 2, the hierarchal database may alternatively be designed to enable lookup of location based information where the location is coordinate based. In this case the appropriate areas may be described as polygons made up of sets of coordinates. In particular, each entry in the tree would also have a polygon (a series of points) defined to describe the area in such as way that a coordinate based location could be used as input to determine the appropriate region within the enterprise. These would still be hierarchically organized, and hence a simple extension of the database described would achieve the desired purpose.

Figure 4:
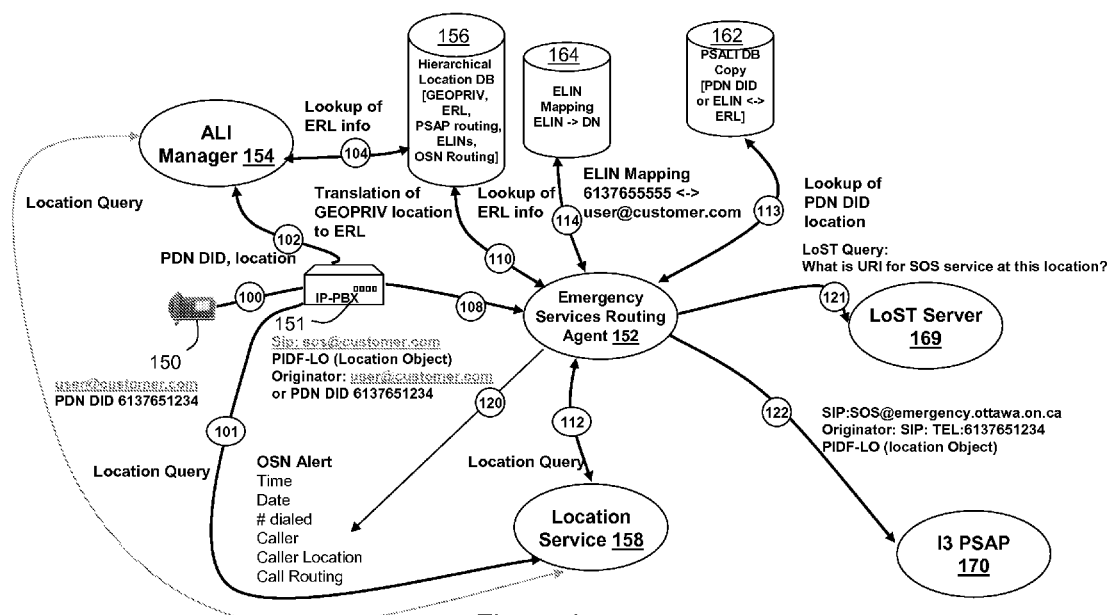
FIG. 4 a scenario where a VoIP Phone with service provided by an IP PBX is employed to contact emergency services, e.g., 911, with civil or coordinate location information known, routing to an evolved NENA I3 Emergency Services Network.

FIG. 4 illustrates a scenario where a VoIP Phone (150) with service provided by an IP PBX (151) is employed to contact emergency services, e.g., 911, with civil or coordinate location information known, routing to an evolved NENA I3 Emergency Services Network. Configuration steps will have been executed prior to the call being placed. A similar situation may also occur when the call is originated by a non-IP phone such as described in FIG. 3.

In step (100) the IP Phone registers with the IP PBX. The IP PBX is in communication with an Emergency Services Routing Agent ("ESRA") (152), which may be executed in a call server, PBX, router, server, gateway, switch, or other network device. In step (101) The IP PBX (151) determines location information for the IP Phone via a mechanism such as a network location service. Alternatively, the IP phone (150) may provide Civil and/or Coordinate location information to the IP PBX (151) as part of a registration process. In step (102) the IP PBX reports a device location change, i.e., new device, to the ALI Manager (154). In step (104) the ALI Manager obtains ERL information for IP Phone and related information from a hierarchical location database (156) and determines that the current location is served by an I3 PSAP. If location information is not provided by the IP PBX for the device, the ALI manager (154) may use the provided device identification, e.g., IP and MAC address, to query a network location service (158) to attempt to determine the location of the phone. In step (107) the ALI Manager updates the location associated with the telephone number (PDN) of the IP Phone in the PS-ALI database copy (162).

As shown in FIG. 2, the hierarchical location database (156) may describe the relationship between geographic entities within the enterprise. The illustrated enterprise database defines: (a) the locations of all enterprise sites and locations within those sites; (b) normal real estate entities such as Country, City, Campus, buildings, floors, etc.; (c) emergency response location information within this framework; and (d) ERLs. One or more ERLs can be associated with a building, floor, etc. For each ERL, the database defines emergency call handling data such as routing, ELINs, OSN destination, etc (may be inherited from a higher level in the tree and relevant emergency services and corresponding telephone numbers for the location). The database may also be used to define L2 access equipment and subnets as they relate to location, and could be used to build wiremaps, populate SNMP MIBs for LLDP-MED in L2 switch equipment and to build IP Subnet mapping tables.

Referring again to FIG. 4, at some time later, an emergency call is placed from the IP phone, e.g., a call to "SOS." The call will be placed via the IP PBX, which may translate 911 to "SOS." The IP PBX is optional and the call could be placed directly from a capable IP phone. The emergency call is routed using SIP, including location information such as a PIDF-LO object, to the Emergency Services Routing Agent (ESRA) (152) as shown in step (108). The PDN of the IP phone could be included in the call request, and the call might be placed without a DID#, although in the case of a pure IP phone making an emergency call it is more likely that only the SIP return address is provided. In response to the call, the ESRA performs a lookup in the Location DB (156) to determine where in the enterprise LAN that the caller is located, using the attached location to determine the ERL of the caller, as shown in step (110). The lookup also provides an indication that the call will be routed to the evolved I3 emergency services network for the provided location. If location information is not provided with the emergency call, the ESRA may query the location service (158) using device identification provided (e.g. IP and/or MAC address of device) to attempt to determine the location of the caller as shown in step (112). Since an I3 PSAP is determined as the destination for the call and location information is provided, a lookup of the PDN is not required. In the event that the location was not provided and a telephone number (PDN or pre-assigned ELIN) was provided with the call, most likely only if an IP PBX is involved, the ESRA also performs a lookup in the PS-ALI DB Copy (162) as shown in step (113) to determine the current location of the IP phone as recorded in the PS-ALI database. The ESRA queries the LoST server to determine the SIP address of the appropriate I3 PSAP serving the selected emergency service in the location of the originator (121). The ESRA forwards the call to the selected PSAP providing the caller location, possibly in the form of an attached PIDF-LO object and provides the caller's SIP return address (122). The call is routed to the selected PSAP which displays the caller information including the location provided to the call taker. In the event the call is disconnected the call taker can contact the originating caller using the SIP return address provided. The ESRA provides an emergency call alert to the appropriate local responders as shown in step (120). The alerts destinations and related information were obtained in steps (110, 112) based on the location of the caller.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for processing an emergency services request in a communications network, comprising the steps of:

receiving the emergency services request;
obtaining requestor location information in a GEOPRIV format;
translating the requestor location information into an Emergency Response Location (ERL); and
conveying the translated requestor location information to a Public Safety Answering Point (PSAP).

2. The method of claim 1 including the further step of selecting an appropriate interface to an emergency response network based on the location of the emergency caller, with translation of signaling information to the form appropriate for the emergency network used.

3. The method of claim 1 including the further step of performing a lookup in a location database to identify the requestor location in terms of an enterprise Local Area Network using information provided with the request to identify the ERL of the requestor.

4. The method of claim 1 including the further step of querying a location service by providing device identification to the location service, in response to which the location service provides requestor location information.

5. The method of claim 1 including the further step of performing a lookup of a PS-ALI database to identify the requestor location information.

6. The method of claim 1 including the further step of selecting an appropriate route/gateway to be used to reach the PSAP appropriate for the location of the requestor.

7. The method of claim 1 including the further step of generating an emergency call notification, and providing the notification to local emergency response personnel based at least in-part on the location of the requestor.

8. The method of claim 1 wherein a hierarchical database is employed to translate the requestor location information into an Emergency Response Location (ERL), and wherein the hierarchical database includes an indication of relationships between geographical entities within an enterprise.

9. The method of claim 8 wherein the hierarchical database defines: (a) the locations of enterprise sites and locations within those sites; (b) normal real estate entities such as Country, City, Campus, buildings, and floors; (c) emergency response location information within this framework; (d) ERLs; and (e) coordinates describing the area to facilitate coordinate based location.

10. Apparatus for processing an emergency services request in a communications network, comprising:
a first network device operative to receive the emergency services request;
a processor of the first network device operative to execute an emergency services routing agent to obtain requestor location information in a GEOPRIV format;
a memory operative to translate the requestor location information into an Emergency Response Location (ERL); and
a transmitter operable to convey the translated requestor location information to a Public Safety Answering Point (PSAP).

11. The apparatus of claim 10 wherein the memory includes a location database having requestor location in terms of an enterprise Local Area Network obtainable using information provided with the request, and including the ERL of the requestor.

12. The apparatus of claim 10 wherein the processor queries a location service by providing device identification to the location service, in response to which the location service provides requestor location information.

13. The apparatus of claim 10 wherein the processor prompts a lookup of a PS-ALI database to identify the requestor location information.

14. The apparatus of claim 10 wherein the processor selects an appropriate route/gateway to be used to reach the PSAP appropriate for the location of the requestor.

15. The apparatus of claim 10 wherein the processor generates an emergency call notification, and prompts provision of the notification to local emergency response personnel based at least in-part on the location of the requestor.

16. The apparatus of claim 10 wherein a hierarchical database is employed to translate the requestor location information into an Emergency Response Location (ERL), and wherein the hierarchical database includes an indication of relationships between geographical entities within an enterprise.

17. The apparatus of claim 16 wherein the hierarchical database defines: (a) the locations of enterprise sites and locations within those sites; (b) normal real estate entities such as Country, City, Campus, buildings, and floors; (c) emergency response location information within this framework; (d) ERLs; and (e) applicable emergency services and their corresponding telephone numbers.

* * * * *